(12) United States Patent
O'Hara et al.

(10) Patent No.: US 11,985,043 B2
(45) Date of Patent: May 14, 2024

(54) AUTOMATED CLASSIFICATION OF NETWORK DEVICES TO PROTECTION GROUPS

(71) Applicant: Arbor Networks, Inc., Westford, MA (US)

(72) Inventors: Sean O'Hara, Ypsilanti, MI (US); Kyle Barkmeier, Ypsilanti, MI (US); Alan Saqui, Ann Arbor, MI (US); Brantleigh Bunting, Toledo, OH (US); Bryan Beecher, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 285 days.

(21) Appl. No.: 16/926,322

(22) Filed: Jul. 10, 2020

(65) Prior Publication Data
US 2021/0314296 A1 Oct. 7, 2021

Related U.S. Application Data

(60) Provisional application No. 63/006,297, filed on Apr. 7, 2020.

(51) Int. Cl.
*H04L 41/16* (2022.01)
*G06F 18/214* (2023.01)
(Continued)

(52) U.S. Cl.
CPC ............ *H04L 41/16* (2013.01); *G06F 18/214* (2023.01); *G06N 7/01* (2023.01); *G06N 20/00* (2019.01);
(Continued)

(58) Field of Classification Search
CPC ............... H04L 41/142; H04L 47/2441; H04L 63/0236; H04L 63/104; H04L 63/105;
(Continued)

(56) References Cited

U.S. PATENT DOCUMENTS 8,682,812 B1 * 3/2014 Ranjan ................. H04L 43/028
706/12
9,386,033 B1 7/2016 Rossman
(Continued)

FOREIGN PATENT DOCUMENTS

WO WO-2014131038 A1 * 8/2014 ......... H04L 12/2803

OTHER PUBLICATIONS

Classifying IoT Devices in Smart Environments Using Network Traffic Characteristics (Year: 2019).*
(Continued)

*Primary Examiner* — Shin-Hon (Eric) Chen
*Assistant Examiner* — Thomas A Carnes
(74) *Attorney, Agent, or Firm* — Foley & Lardner LLP

(57) ABSTRACT

A method and system for aggregating into a unique aggregated group (AG), protection groups (PGs) that are possible classifications with at least a threshold probability for a same unique combination of IP addresses. The PGs and the unique combination of IP addresses are included in the AG. Each of the IP addresses of the unique combination of IP addresses have respective associated probabilities for each PG included in the AG. The method further includes selecting and providing for display AGs based on the probabilities associated with the respective IP addresses included in the AGs, and providing for display at least one interactive graphical element in association with each AG selected for display. User activation of one of the interactive graphical element accepts assignment of one or more selected IP addresses included in the AG to a selected one of the one or more PGs included in the AG.

23 Claims, 9 Drawing Sheets

(51) Int. Cl.
*G06N 7/01* (2023.01)
*G06N 20/00* (2019.01)
*H04L 9/40* (2022.01)
*H04L 41/142* (2022.01)
*H04L 47/2441* (2022.01)

(52) U.S. Cl.
CPC ........ *H04L 41/142* (2013.01); *H04L 47/2441* (2013.01); *H04L 63/0236* (2013.01); *H04L 63/104* (2013.01); *H04L 63/105* (2013.01); *H04L 63/306* (2013.01)

(58) Field of Classification Search
CPC ...... H04L 63/306; G06N 20/00; G06N 7/005; G06K 9/6256
See application file for complete search history.

(56) References Cited

U.S. PATENT DOCUMENTS

| | | | | |
|---|---|---|---|---|
| 10,341,350 | B2* | 7/2019 | Lazarovitz | H04L 63/10 |
| 10,616,133 | B2* | 4/2020 | Zhao | H04L 47/82 |
| 10,652,283 | B1 | 5/2020 | Harvey | H04L 63/205 |
| 11,038,906 | B1* | 6/2021 | Bingham | H04L 63/1425 |
| 11,115,823 | B1* | 9/2021 | Heiland | H04L 63/1425 |
| 2006/0242190 | A1* | 10/2006 | Wnek | G06F 16/367 |
| | | | | 707/999.102 |
| 2010/0162383 | A1 | 6/2010 | Linden et al. | |
| 2012/0209799 | A1* | 8/2012 | Ohama | G06V 40/20 |
| | | | | 706/20 |
| 2013/0219035 | A1 | 8/2013 | Detienne et al. | |
| 2014/0279659 | A1* | 9/2014 | Seay | G06Q 10/083 |
| | | | | 705/337 |
| 2015/0169699 | A1* | 6/2015 | Gilbert | G06F 3/04842 |
| | | | | 715/823 |
| 2016/0105531 | A1* | 4/2016 | Godfrey | H04L 67/61 |
| | | | | 709/224 |
| 2017/0177627 | A1* | 6/2017 | Singh | G06F 16/353 |
| 2018/0004972 | A1 | 1/2018 | Ruggiero et al. | |
| 2018/0048534 | A1* | 2/2018 | Banga | G06N 20/00 |
| 2018/0139240 | A1 | 5/2018 | Voit et al. | |
| 2018/0191743 | A1* | 7/2018 | Reddy | G06N 20/00 |
| 2018/0218926 | A1 | 8/2018 | Stuckey et al. | |
| 2019/0123983 | A1* | 4/2019 | Rao | H04L 43/062 |
| 2019/0171966 | A1 | 6/2019 | Rangasamy | |
| 2019/0268270 | A1 | 8/2019 | Fattah | |
| 2020/0336397 | A1* | 10/2020 | Tedaldi | G06N 3/0454 |
| 2021/0194931 | A1* | 6/2021 | Parashar | H04L 41/22 |
| 2022/0086071 | A1* | 3/2022 | Sivaraman | H04L 43/062 |

OTHER PUBLICATIONS

Characterizing and Classifying IoT Traffic in Smart Cities and Campuses (Year: 2017).*

* cited by examiner

| IP Address | PG1 (83%) | PG2 (42%) | PG3 (89%) | PG4 (75%) | PG5 (25%) | PG6 (97%) | PG7 (92%) | PG8 (86%) | PG9 (89%) |
|---|---|---|---|---|---|---|---|---|---|
| 1.2.3.4 | x | x |  |  |  |  |  |  |  |
| 2.3.4.5 | x |  | x |  |  |  |  |  |  |
| 3.4.5.6 |  | x | x |  |  |  |  |  |  |
| 4.5.6.7 |  |  |  |  |  | x | x |  |  |
| 5.6.7.8 |  |  |  |  | x | x | x |  |  |
| 6.7.8.9 |  |  |  |  | x | x | x |  | x |
| 7.8.9.10 |  |  |  | x |  |  |  | x |  |
| 8.9.10.11 |  | x |  | x |  |  |  |  | x |

Probability Clusters: ▬▬▬ High Probability  ━ ━ ━ Medium Probability  - - - - Low Probability

| Aggregated Groups | Sorted Matches | | | Map Keys | Average Sort Value | Member IP Address |
|---|---|---|---|---|---|---|
| AG2 | PG6 | PG7 |  | "PG6.PG7" | (97+92)/2 = 94.5 | 4.5.6.7 |
| AG3 | PG7 | PG9 |  | "PG7.PG9" | (92+89)/2 = 90.5 | 5.6.7.8, 6.7.8.9 |
| AG1 | PG6 | PG3 | PG1 | "PG6.PG3.PG1" | ... = 89.3 | 1.2.3.4, 2.3.4.5, 3.4.5.6 |
| AG4 | PG8 |  |  | "PG8" | (86)/1 = 86 | 7.8.9.10 |

Fig. 7

AUTOMATED CLASSIFICATION OF NETWORK DEVICES TO PROTECTION GROUPS

CROSS REFERENCE TO RELATED APPLICATIONS

This application claims priority to U.S. patent application Ser. No. 63/006,297 filed Apr. 7, 2020, which is incorporated herein by reference in its entirety.

FIELD OF THE DISCLOSURE

The disclosed embodiments generally relate to computer network protection, and more particularly, to a system and method for automated classification of network devices to protection groups.

BACKGROUND OF THE DISCLOSURE

A network monitoring system can customize protection settings it uses for monitoring a protection group to provide optimal protection for the protection group. The protection group is a group of protected devices that have similar protection needs. The protection settings are set to most effectively and efficiently detect malicious traffic, avoid false alerts about attacks, and avoid categorizing legitimate network traffic as malicious (which could result in dropping legitimate network traffic). The network monitoring system may have the capability of applying customized protection settings to tens or hundreds of protection groups, allowing for a high level of granularity with which to divide the protected devices into protection groups.

Once the protection groups are created, administrators of monitoring systems for protected networks can find it time consuming and tedious to assign protected devices to a large selection of protection groups. Rather, administrators may avoid the tediousness of this task by only creating a small number or protection groups so that the respective protected devices can only be assigned to protection groups selected from a small selection of available protection groups, without taking advantage of the granularity of customized protection settings available. Furthermore, once a protected device is assigned to a protection group, even though network configuration and behavior may change over time or in time-related patterns, the assignments may not be updated.

Such suboptimal assignments of protected devices to protection group configurations can result in reduced effectiveness and efficiency in protecting the protected devices. Effectiveness and efficiency can decline as the network configuration and/or behavior changes over time or in cyclical patterns. Practically, the result can include excessive false positive alerts and dropping of legitimate network traffic.

Conventional methods and systems for providing customized protection groups have generally been considered satisfactory for their intended purpose. However, there is still a need in the art to take advantage of the granularity of protection settings available via customized protection groups when assigning protected devices to protection groups and as network behavior and configuration evolves.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of interactive configuration of protection groupings for IP addresses of protected network hosts. The method includes receiving a collection of n-tuples. Each n-tuple includes an IP address of a protected network host and a collection of one or more protection groups that are classification possibilities for the IP address. The method includes receiving a collection of n-tuples. The IP address of each n-tuple has an associated probability for each of the protection groups of the n-tuple, wherein the associated probability represents a probability of the protection group being an appropriate classification for the IP address. The method further includes aggregating into a unique aggregated group one or more protection groups that are possible classifications with at least a threshold probability for a same unique combination of IP addresses. The one or more protection groups and the unique combination of IP addresses are included in the aggregated group and each of the IP addresses of the unique combination of IP addresses have respective associated probabilities for each protection group included in the aggregated group.

The method further includes selecting and providing for display aggregated groups based on the one or more probabilities associated with the respective IP addresses included in the aggregated groups, and providing for display at least one interactive graphical element in association with each aggregated group selected for display. User activation of one of the at least one interactive graphical element accepts assignment of one or more selected IP addresses included in the aggregated group to a selected one of the one or more protection groups included in the aggregated group.

In one or more embodiments, activation of the at least one interactive graphical element can cause one or more of the IP addresses included in the aggregated group to be assigned to an appropriate protection group. When an individual protection group is selected using the at least one interactive graphical element, the appropriate protection group can be the selected protection group, and when an individual protection group is not selected using the at least one interactive graphical element, the appropriate protection group can be the protection group included in the aggregated group for which each selected IP address has the highest associated probability.

In one or more embodiments, when one or more individual IP addresses included in the aggregated group are selected using the at least one interactive graphical element, the selected one or more IP addresses can be assigned to the appropriate protection group, and when no IP addresses included in the aggregated group are selected using the at least one interactive graphical element, all of the IP addresses included in the protection group can be assigned to the appropriate protection group.

In one or more embodiments, the IP addresses of each aggregated group can be assigned an order as a function of each IP address' associated probability.

In one or more embodiments, a probability associated with an IP address that represents a probability of a particular protection group being an appropriate classification for the IP address can be determined to be relatively high as a function of at least one of the order assigned to the IP address within one of the aggregated groups or a value of the probability relative to a predetermined threshold.

In one or more embodiments, the probability associated with an IP address that represents a probability of a particular protection group being an appropriate classification for the IP address can be determined by applying models that were trained using machine learning.

In one or more embodiments, the aggregated groups can be sorted based on whether the aggregated group includes one protection group, multiple protection groups, or no protection groups that are possible classifications to an IP address included in aggregated group associated with a relatively high probability.

In one or more embodiments, the aggregated groups can be displayed based on the order in which the aggregated groups are sorted.

In one or more embodiments, the method can further include determining a probability associated with each protection group included in the aggregated group, wherein the probability associated with the protection group can be a function of the probability associated with each IP address included in the aggregated group that represents a probability of the protection group's being an appropriate classification for the IP address.

In one or more embodiments, the method can further include providing one of the selected aggregated groups for display, including displaying the IP addresses included in the aggregated group and selectively displaying identification of and the probability associated with each protection group included in the aggregated group.

In one or more embodiments, the method can further include selectively providing an unexpanded display mode and an expanded display mode, wherein when the unexpanded display mode is provided, a particular aggregated group can be displayed using a contiguous graphic set having one associated interactive graphical element of the at least one interactive graphical elements and multiple joined portions. Each joined portion can correspond to one of the protection groups included in the aggregated group, wherein activation of the associated interactive graphical element can cause selected or all of the IP addresses included in the aggregated group to be assigned to the protection group included in the aggregated group that has the highest associated probability. When the expanded display mode is provided, the particular aggregated group can be displayed using a noncontiguous graphic set having multiple unjoined portions, wherein each unjoined portion can have an associated interactive graphical element and correspond to one of the protection groups included in the aggregated group. Activation of the interactive graphical elements associated with one of the unjoined portions can cause selected or all of the IP addresses included in the aggregated group to be assigned to the protection group that corresponds to the unjoined portion.

In one or more embodiments, the method can further include providing a global interactive graphical element, wherein activation of the global interactive graphical element can cause, for each of the aggregated groups displayed, all of the IP addresses included in the aggregated group to be assigned to the protection group included in the aggregated group that has the highest associated probability.

In aspects of the disclosure, a computer system and computer-readable medium are provided that implement the method.

BRIEF DESCRIPTION OF THE DRAWINGS

The accompanying appendices and/or drawings illustrate various non limiting, example, inventive aspects in accordance with the present disclosure:

FIG. 7 shows an example classification map and an example aggregation table that can be used for aggregating information and preparing information for display, in accordance with an aspect of the disclosure;

DETAILED DESCRIPTION OF CERTAIN EMBODIMENTS

A system and method are provided that leverage machine learning to assign protected devices of a protected network to protection groups based on application of machine learning to observed behavior of the network, e.g., observed behavior of network traffic to and/or from the protected devices. Concurrently filed U.S. patent application Ser. No. 16/926,358, filed Jul. 10, 2020, entitled "Automated Classification of Network Devices to Protection Groups," claiming priority to US Provisional Application No. 63/006,297, filed Apr. 7, 2020, describes an automated process for assigning protected devices to protection groups. It has been found that automatic protection group assignments can be enhanced when combined with a manual process to accept or deny proposed assignments. This disclosure is directed to an interactive manual process that is streamlined for efficiency and interacts with the machine learning driven automated process. Furthermore, the disclosed method can provide feedback to the automated process for improving the assignment process. Once confidence is sufficiently increased in the assignment process, the disclosed method further provides a mechanism for increasing automation of the assignment process.

Figure 1:
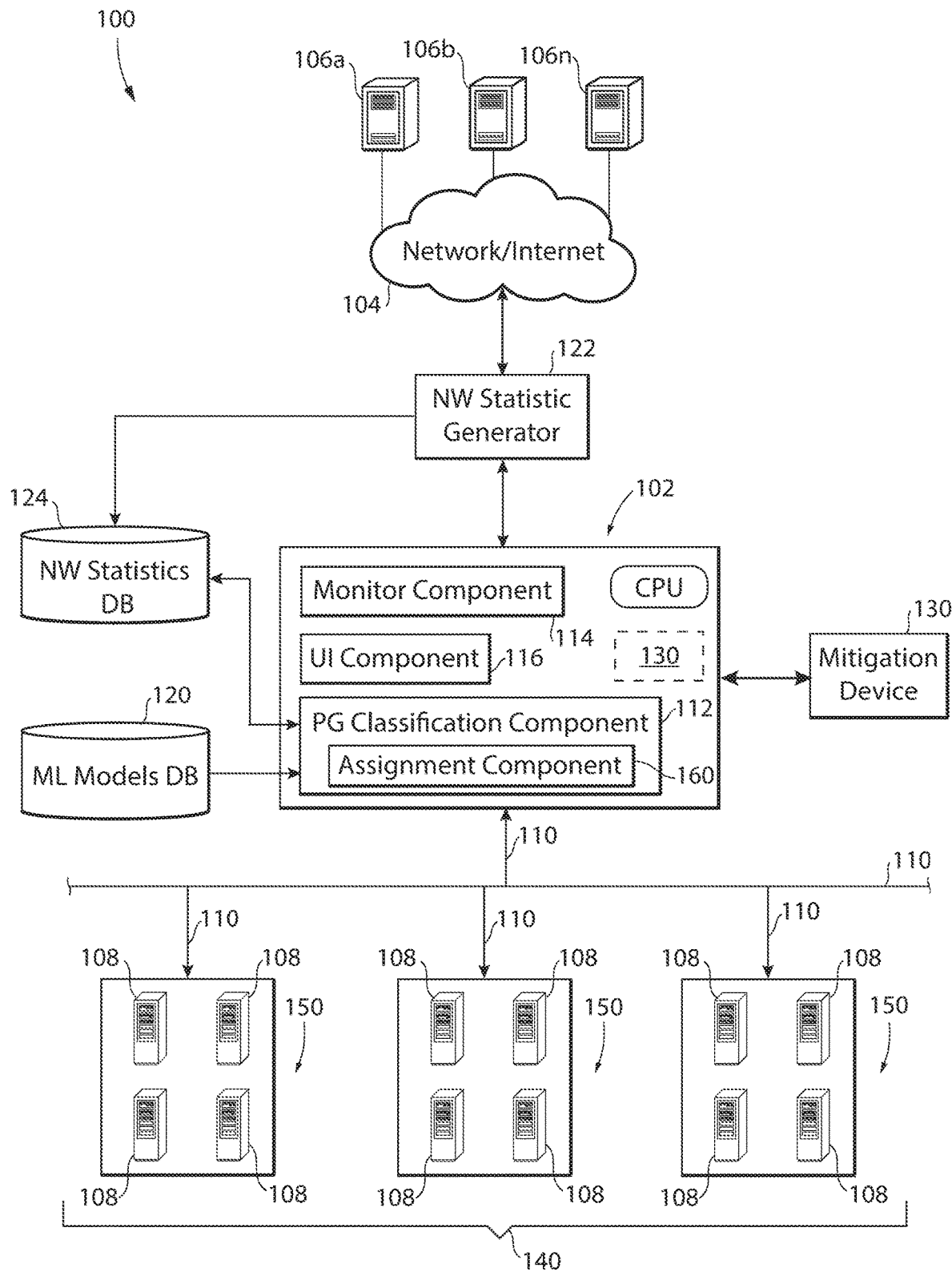
FIG. 1 illustrates a block diagram of an example network system having a protected network to which automatic protection group classification is applied, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-10, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the network system 100 is provided, wherein network system 100 includes a protected network 140 that can facilitate internal communication within the protected network 140 and/or can communicate with external computing systems (e.g., 106a-106n) via an external network 104.

The protected network 140 includes a network protection system 102 that protects one or more protected devices 108. The network protection system 102 can communicate with the external network 104 via one or more wired and/or wireless external communication links. Additionally, the network protection system 102 can communicate with the protected devices 108 via one or more wired and/or wireless internal communication links. Communications among the protected devices 108 and between the protected devices 108 and the external network 104 are monitored by the network protection system 102.

Network protection system 102 enables automatic classification of protected devices 108 for automatic assignment to protection groups 150 based on observed characteristics of network behavior over time. Protected devices 108 are assigned to protection groups 150 in order that network usage of protected devices 108 belonging to the same protection group 150 have a higher degree of similarity than network usage of protected devices 108 assigned to other protection groups 150. Classification assignments of protected devices 108 to protection groups 150 can be performed automatically in real time during network operation, or classifications can be submitted to users for confirmation or feedback before performing the actual assignment. Administrators of the protected network 140 can be provided with a user interface that enables the administrator to receive classification suggestions of automated assignments of protection devices 108 to protection groups 150, confirm, reject, or select from multiple suggestions, all in real time, even as configuration of the protected network or traffic patterns change.

Network protection system 102 applies statistics about network flows of network traffic to protected devices 108 to machine learning (ML) models for performing the automatic classification process. A network flow is defined as a summary of bounded communications between two or more endpoints, wherein one of the endpoints is a destination having a destination address. The ML models are trained using machine learning applied to the network traffic statistics over time. Once trained, the ML models are deployed to monitor network flows of real time network traffic for updating classifications and continuous refinement of the ML models based on administrator feedback. The ML models can self-adapt to changes in network traffic over time to account for the cyclic nature of network usage and evolving customer networks.

Network monitoring system 102 has a capability of allowing many protection groups 150 to be configured so that each protection group can have fine-tuned protection parameters, e.g., for identifying malicious traffic. The automated assignment to protection groups 150 overcomes the risk of under-utilization that can affect manual systems having fine-tuning capabilities. One reason that under-utilization can arise is that manual performance of the task is cumbersome and tedious. Another reason for under-utilization is the lack of coordination between actual real-time conditions and assignments to protection groups 150. When performed manually, an administrator can only estimate real time conditions based on whatever knowledge is available. As network conditions or configurations change, an administrator would be unaware that a protection group assignment 150 is no longer optimal, and the effectiveness of the assignments of protected devices 108 to protection groups 150 is bound to deteriorate.

By automating suggested or actual protection group assignments for protected devices, protection from DDoS attacks becomes finely tuned to the needs of the particular protected devices 108 based on the actual, real time network behavior. Furthermore, administrators can merely accept or reject protection group assignment suggestions, including updates to the protection group assignments, without being bogged down with determining initial assignments or when to modify assignments. By fine tuning assignments to protection groups, dropping of legitimate traffic by threat detection or mitigation systems can be reduced or minimized. Even as network conditions and configurations change, the protection group assignments can be automatically updated.

Protected devices 108 are computing devices having hardware, software and/or firmware, such as servers, laptop devices, mobile devices (e.g., laptops, smartphones, cell phones, and tablets), network elements (e.g., routers, switches, and firewalls), embedded computer devices that are embedded in other devices (e.g., appliances, tools, vehicles, or consumer electronics). The protected devices 108 can communicate via the protected network 140 with one another or with the external network 104.

The protected network 140 and external network 104 can include one or more networks, such as an intranet, a local area network (LAN), and/or a wide area network (WAN). In examples, the protected network 140 can be an enterprise network, such as a school network, business network, and government network, to list a few examples, that can connect to the Internet. The external network 104 is external to protected network 140 and can be included in the Internet.

Central or distributed intercept components 110 are configured to actively or passively intercept network traffic to protected devices 108. Intercept components 110 can include software, firmware, and/or hardware components, such as taps, probes, or port mirrors. These elements can be positioned inline, and/or remote relative to communication links 120. Network statistics generator 122 can receive intercepted network traffic in real time from intercept components 110. The term "receive," as used in this context refers to accessing, receiving a transmission, retrieving, reading, or otherwise obtaining.

In the data ingestion phase, processing of the network traffic (such as aggregation and sorting of packets of the network traffic into network flows or determining characteristics of the network flows) can be performed by intercept components 110 and/or network statistics generator 122. Intercept components 110 can provide the network traffic data to network statistics generator 122 as raw data or as network flows, or as network flows with supplemental data about characteristics of the network flows. The supplemental data can include network flow information (NFI) about the network traffic aggregated into network flows, such as protocol, port, and statistical flow information (SFI) per network flow. SFI for a network flow can include, for example throughput and latency. Selected NFI for each network flow can be stored in network statistics database 124.

With regards to protection of protected network 140, in embodiments, at least portions of the network protection system 102 are located between the external network 104 and the protected network 140. In other embodiments, at least portions of the network protection system 102 are located within the external network 104 or protected network 140. At least portions of the network protection system 102 can be located at a network edge (inside or outside of the protected network 140) or deeper within the protected network 140.

The network protection system 102 includes or communicates with a protection group (PG) classification component 112, a monitor component 114, a user interface (UI) component 116, a machine learning (ML) models database (DB) 120, the network (NW) statistics generator 122, the network statistics database 124, and optionally a mitigation device (MD) 130. In one or more embodiment, the network protection system 102 can be configured as a firewall or a router.

The PG classification component 112 includes or accesses an interactive component. Interactive component interacts with user interface component 116 to display suggested classifications by graphical user interface (GUI), wherein the GUI includes one or more interactive components that can be used to accept or decline the suggested classifications. The display of the suggested classifications and the interactive components is configured to display the information and elicit accept or decline responses in a consolidated, efficient manner, providing a streamlined interactive manual process that interacts with the machine learning driven automated process.

Each of protection group classification component 112, a monitor component 114, a user interface component 116, network statistics generator 122, and mitigation device 130 can be configured as individual processing devices or can be fully or partially integrated with one another, wherein integration includes sharing one or more hardware and/or software components. Machine learning models database 120 and network statistics database 124 can be configured as individual long term storage devices or can be fully or partially integrated with one another.

Monitor component 114 monitors network traffic directed to protected devices 108. The monitoring performed is customized to the protection group 150 to which the destination protected device 108 belongs. In an example scenario, tens or more than a hundred protection groups can be accommodated, each with different protection settings that determine the type of monitoring that is performed for the member protected devices 108 of the protection group 150. Some examples of customized protection settings include rate based blocking thresholds, payload pattern matching settings, TCP connection limiting settings, TCP connection authentication settings, DNS rate limiting settings, DNS request pattern matching settings, and HTTP rate limiting settings.

Accordingly, each protection group 150 can have protection settings that are optimal for the protection group to most effectively and efficiently detect malicious traffic, avoid false alerts about attacks, and avoid categorizing legitimate network traffic as malicious (which could result in dropping legitimate network traffic).

The user interface component 116 communicates with user input and output devices, such as via a graphical user interface (GUI) by which a user can input selections and receive output, such as alerts, requests for user feedback, and data (e.g., depicted graphically, textually, or pictorially). The user interface component 116 communicates with other components of PG classification component 112 to provide data input by users or output data from the components to the users.

The user interface component 116 can provide a GUI that enables a user to create protection groups 150, view assignment of protected hosts 108 to the protection groups 150, receive and respond to requests for feedback regarding classification of the protected hosts 108 for assignment to the protection groups 150.

MD 130 may apply mitigation countermeasures to network traffic determined by monitor component 114 to be malicious. Mitigation countermeasures can include, for example, blocking traffic, redirecting the traffic to a selected destination (such as a scrubbing device), and/or blacklisting the source (e.g., an IP address of the source) of the suspicious traffic. Blocked traffic is not allowed to be transmitted to its intended destination (e.g., a destination IP address indicated in the traffic). When the source of the suspicious traffic is blacklisted, future traffic from the same source IP address may be blocked.

The network protection system 102, ML models database 120, a network statistics generator 122, network statistics database 124, and MD 130 can be implemented as one or more physical or virtual devices. The ML models database 120, a network statistics generator 122, network statistics database 124, and MD 130 can be included within the network protection system 102 or can be computing systems separate from, but in communication with, the network protection system 102. Whether implemented as physical or virtual device(s), the network protection system 102, ML models database 120, a network statistics generator 122, network statistics database 124, and MD 130 use a local or remote processing device having hardware or firmware that executes software instructions, which enables performance of the disclosed functions. Additionally, the network protection system 102, ML models database 120, a network statistics generator 122, network statistics database 124, and MD 130 can share one or more hardware, firmware, and/or software components.

Following a data ingestion phase in which network traffic is intercepted and network flows are aggregated, a data preparation phase is implemented. In the data preparation phase, PG classification component 112 prepares the NFI for training one or more ML models, validating the ML models, and testing the ML models. PG classification component 112 is configured to access NFI, including SFI, associated with respective network flows stored in network statistics database 124. For the purposes of training, validating, and testing, preparation of the NFI can include filtering the NFI to eliminate data for flows that are not assigned to a protection group 150. Preparation can further include normalizing the NFI and partitioning the NFI into different sets.

The sets can include, for example, a training NFI set to be used for training the ML models, a validation NFI set to be used for validating the ML models, and a testing NFI set to be used for testing the ML models. The training, testing, and validation NFI sets do not overlap with respect to the destination address for each network flow associated with the NFI.

In one or more embodiments, the NFI can be augmented, such as to include a traceroute tree for the network flows. Further, the SFI can be augmented, such as to include a number of hops to the destination and/or ping latency, per network flow. The NFI, SFI and augmented NFI and SFI are analyzed during the ML model training in an attempt to form algorithms that will be able to predict the most suitable protection group 150 as a function of the NFI, SFI, augmented NFI and augmented SFI per destination protected device 108.

With regards to training the ML models during a training phase, several ML models can be trained by fitting each ML model to the training NFI and known assignments for each network flow. Examples of ML models to be trained include kNN, Random Forest, Neural Network, Stacks, etc. Each ML model is trained using machine learning to classify destination of network flows of the accessed network traffic into their pre-assigned protection groups as a function of the network statistics provided in the SFI. In one example that demonstrates how certain statistics are considered during model training, when statistics associated with a destination indicate that the destination is transmitting a high volume of network traffic, having a common set of destination ports, and receiving traffic for a specific IP protocol, that destination is classified as a web server and is assigned to a protection group 150 with protection settings fine-tuned for a web server. With regards to validating the ML models during a validation phase, the validation NFI set are applied to the trained ML models. The destination addresses for protected devices associated with the NFI in the validation NFI set correspond to known protection groups. The performance of the ML models is based on whether the respective ML models classify the protected devices having the destination addresses associated the NFI to the correct protection groups. ML models that perform below a performance threshold are filtered out as underperforming. The remaining ML models are validated. Additionally, ML model input parameters can be tuned during the validation phase for increasing optimal performance.

The validated ML models are deployed and tested during a testing phase using the testing NFI set. The testing NFI set is applied to the validated ML models. The destination addresses for protected devices associated with the NFI in the testing NFI set correspond to known protection groups. The performance of the ML models is based on whether the respective ML models classified the protected devices having the destination addresses associated the NFI to the correct protection groups. A test score is assigned to each of the ML models based on the ML model's performance making accurate classifications. ML models that perform below a performance threshold are filtered out as underperforming and are not used for further deployment. The remaining ML models are used for real time deployment.

During a real time deployment phase, as network flows are received in real time by network statistics generator 122, corresponding NFI data is received by PG classification component 112 and applied to the deployed ML models. NFI for network flows having a destination address of a protection device that is not yet classified to a protection group are processed by PG classification component 112, as there is no need to process NFI for network flows having a destination address of a protection device already classified during the training phase. The NFI for the network flows are normalized. In one or more embodiments, PG classification component 112 determines and normalizes augmented NFI and/or SFI and includes these with the NFI. PG classification component 112 classifies the protection device 108 that corresponds to the destination address of each network flow associated with the NFI to a protection group by applying the NFI to the ML models. This application of NFI to the ML models includes application of the SFI to the ML models for determining the classification based on the SFI.

PG classification component 112 outputs as classification metadata a classification for the protected device with an associated probability. Since each ML model can generate a classification, PG classification component 112 determines the probability of a recommended classification based on the classification output of the different ML models used. The probability of the recommended classification is based on how many of the ML models produced that classification and test scores associated with those ML models. If all of the ML models used are in consensus for the same classification, the probability for the recommended classification is increased. Similarly, if the ML models were not in consensus, the probability for the recommended classification can be decreased.

The classification metadata can include different classifications produced by different ML models. The classification metadata associated with each classification can further include the probability for the classification (which is based on how many of the ML models produced that classification and test scores associated with those ML models), and identification of the ML model(s) that produced the classification. In one or more embodiments, the classification metadata further includes the test score associated with each ML model that produced the classification. PG classification component 112 can further determine a probability score for each classification produced, wherein the probability score is a function of the number of ML models that produced the classification and the test scores associated with those ML models.

In a feedback phase, PG classification component 112 determines whether auto-classification is enabled. If auto-classification is enable, PG classification component 112 assigns the protection device 108 to a protection group 150 using the recommended classification.

If auto-classification is not enabled, the administrator is prompted for user feedback via user-interface component 116. Prompting can include sending a request or configuring the GUI to allow the administrator to provide the user feedback. The user feedback request can provide the administrator with the opportunity to accept or reject the recommended classification. In one or more embodiments, the user feedback request can include presentation of additional information in the classification metadata, such as each classification produced by the different ML models, identification of the ML models and their associated test scores. The probability score associated with each of these classifications can also be presented. The administrator can provide user feedback by selecting one of the classifications available.

The user feedback is applied by assigning the protected device to a protection group in accordance with the selected classification. Furthermore, the user feedback is processed by updating the ML models as a function of the administrator's classification selection. When user feedback accepts a classification (which includes selecting that classification), a confidence value associated with each ML model that made the selected classification can be incremented. Similarly, when user feedback rejects (which includes not selecting) a classification, a confidence value associated with the ML model that made the rejected classification can be decremented.

In one or more embodiments, the accepted classifications are likely to become part of the training data for subsequent iterations of the training phase. Previously used ML models can be re-trained with this feedback taken into consideration. Rejected classifications can also be remembered to avoid making the same classification in future deployments. By performing continuous iterations of the training phase, retraining occurs each time the training phase is performed. During retraining, ML models are trained by taking into account new assignments and rejected classifications from previous deployment and feedback phases.

Figure 2:
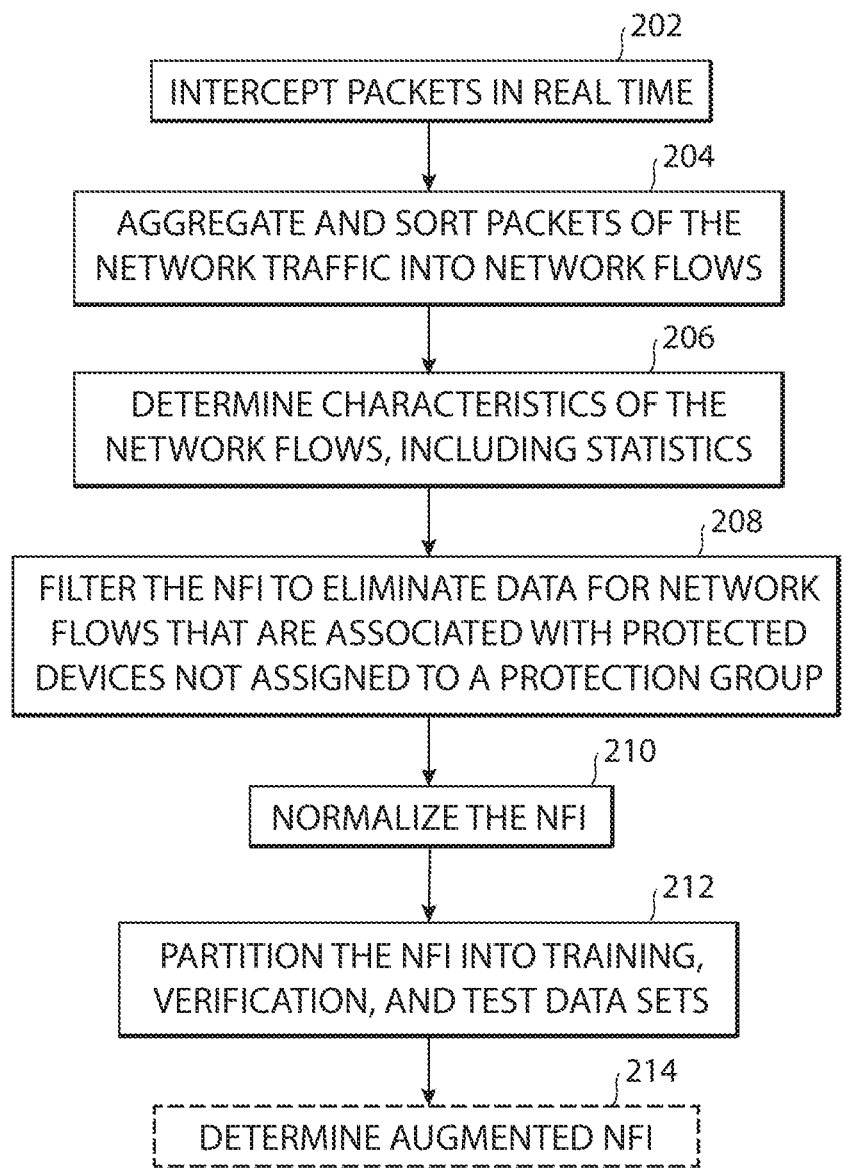
FIG. 2 is an example flowchart showing an example method performed during data ingestion and data preparation phases, in accordance with an aspect of the disclosure.
Figure 3:
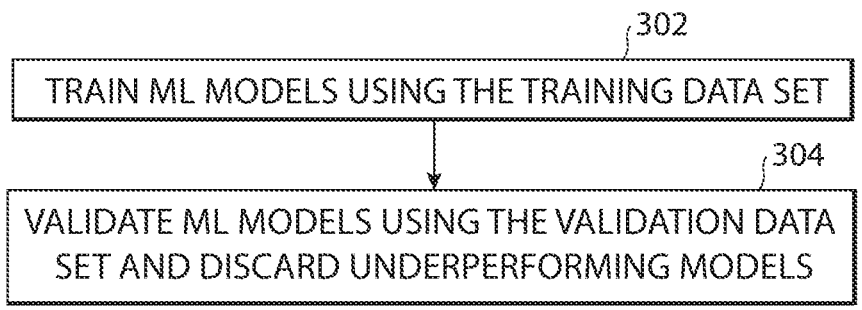
FIG. 3 is an example flowchart showing an example method performed during a training phase, in accordance with an aspect of the disclosure.
Figure 4:
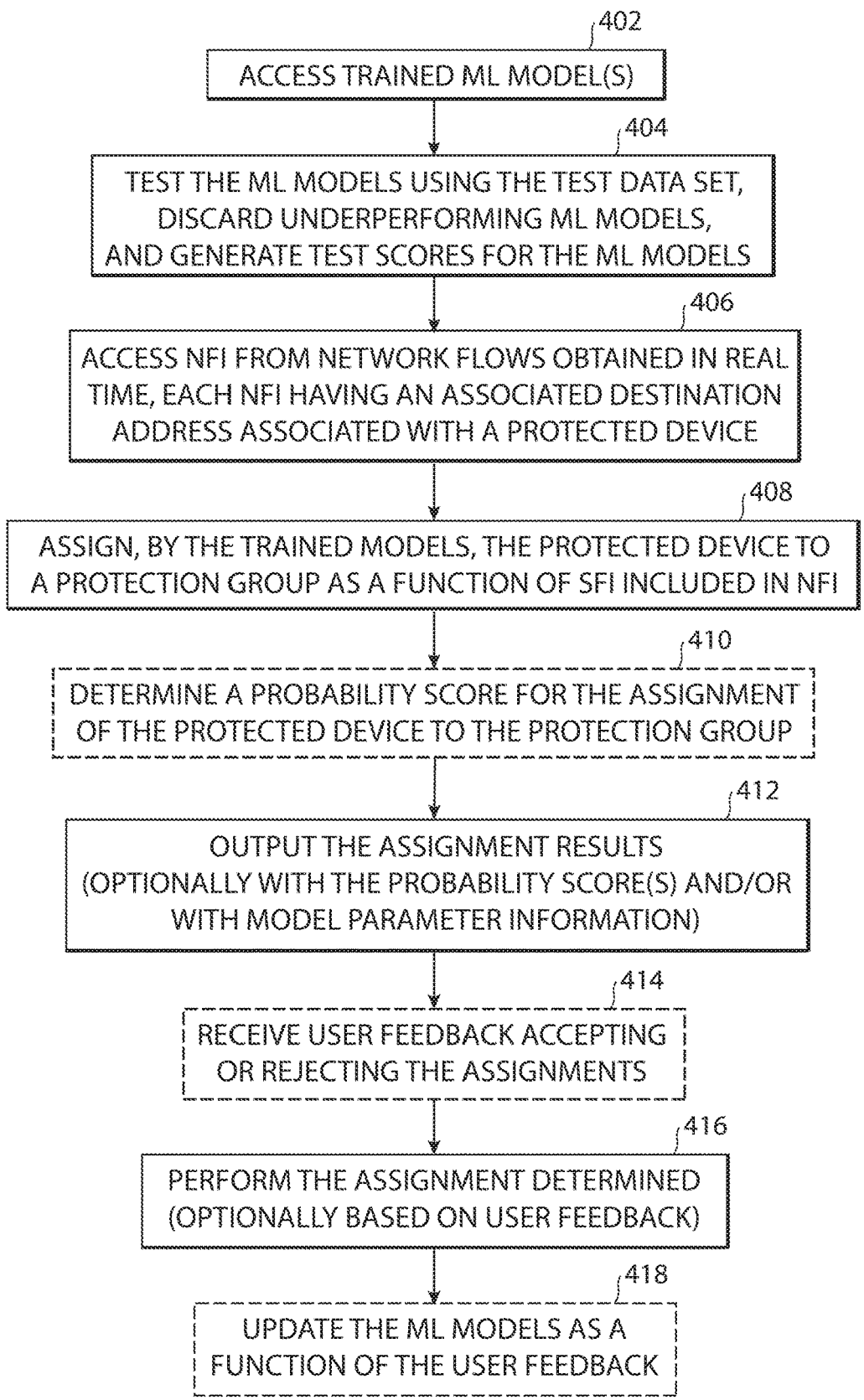
FIG. 4 is an example flowchart showing an example method performed during deployment and feedback phases, in accordance with an aspect of the disclosure.

Data profiling is continued as an ongoing process. The protection group profiling process is executed at the end of each feedback phase iteration for each protection group that had at least one classification accepted. With reference now to FIGS. 2-4, shown are flowcharts demonstrating implementation of the various exemplary embodiments. It is noted that the order of operations shown in FIGS. 2-4 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 2 shows a flowchart of operations performed during the data ingestion and preparation phase, such as by data intercept components and/or a network statistic generator, e.g., data intercept components 110 and/or network statistic generator 122 shown in FIG. 1. At operation 202, network traffic is intercepted in real time. At operation 204, packets of the network traffic are aggregated and sorted into network flows. At operation 206, characteristics of the network flows are determined. The characteristics can be stored as NFI, such as in statistics database 124 shown in FIG. 1. The characteristics include SFI that includes statistics about the network flows. The SFI can include, for example throughput and latency. The NFI can further identify protocols and ports used by the respective network flows.

The method continues during the data preparation phase. At operation 208, the NFI is filtered to eliminate NFI data associated with destination addresses of protected devices (such as protected devices 108 shown in FIG. 1) that are not classified to a protection group. At operation 210, the NFI is normalized. At operation 212, the NFI is partitioned into training, verification, and test data sets. In one or more embodiments, at operation 214, augmented NFI is determined. Operation 214 can be optional, as indicated by its dotted outline.

With reference to FIG. 3, a flowchart is shown of operations performed by a protection group classification component, such as protection group classification component 112 shown in FIG. 1, during the training phase. At operation 302, one or more ML models are trained using the training data set. The training is performed as a function of the NFI, including the SFI, in the training data set. If augmented data was determined at operation 308, the NFI and SFI can included augmented data. At operation 304, the ML models are validated using the validation data set and underperforming models are discarded.

With reference to FIG. 4, a flowchart is shown of operations performed by a protection group classification component, such as protection group classification component 112 shown in FIG. 1. The method begins during the deployment phase. At operation 402, the trained ML model(s) that were trained in FIG. 3 are accessed. At operation 404, the ML model(s) are tested using test data. Based on performance as determined by the testing, underperforming ML models are discarded. Test scores are generated for the ML models based on their performance as indicated by the testing.

At operation 406, NFI from network flows obtained in real time is accessed. NFI associated with each network flow has an associated destination address associated with a protected device, such as protected devices 408 shown in FIG. 1. At operation 408, the trained ML models classify the protected device identified in the NFI associated with the respective network flows, wherein each protected device 408 is classified to at least one protection group. The classification is made as a function of SFI included in the NFI.

In one or more embodiments, at operation 410, a probability score is determined for the classification of the protected device to the at least one protection group. Operation 410 can be optional, as indicated by its dotted outline. At operation 412, the classification results are output. In one or more embodiments, the classification results can include probability score(s) and/or model parameter information about the ML models that performed the assignments. The model parameter information can include identification of the respective ML models and test scores associated with the ML model. The model parameter information can include a description of the type of model and settings that were used for performing the assignment.

At operation 414, during a feedback phase, user feedback is received. Operation 414 can be optional, as indicated by its dotted outline. The user feedback can be received in response to a request or prompt, or the user feedback can be output based on initiation by an administrator without being requested or prompted. The user feedback can indicate whether the administrator accepts or rejects the classifications that were output. At operation 416, the assignment of the protection device to a protection group is performed.

This assignment can be performed based on the classification determination output at operation 412 and/or based on user feedback received at operation 414. At operation 418, the ML models can be updated as a function of the user feedback. Operation 418 can be optional, as indicated by its dotted outline.

Figure 5:
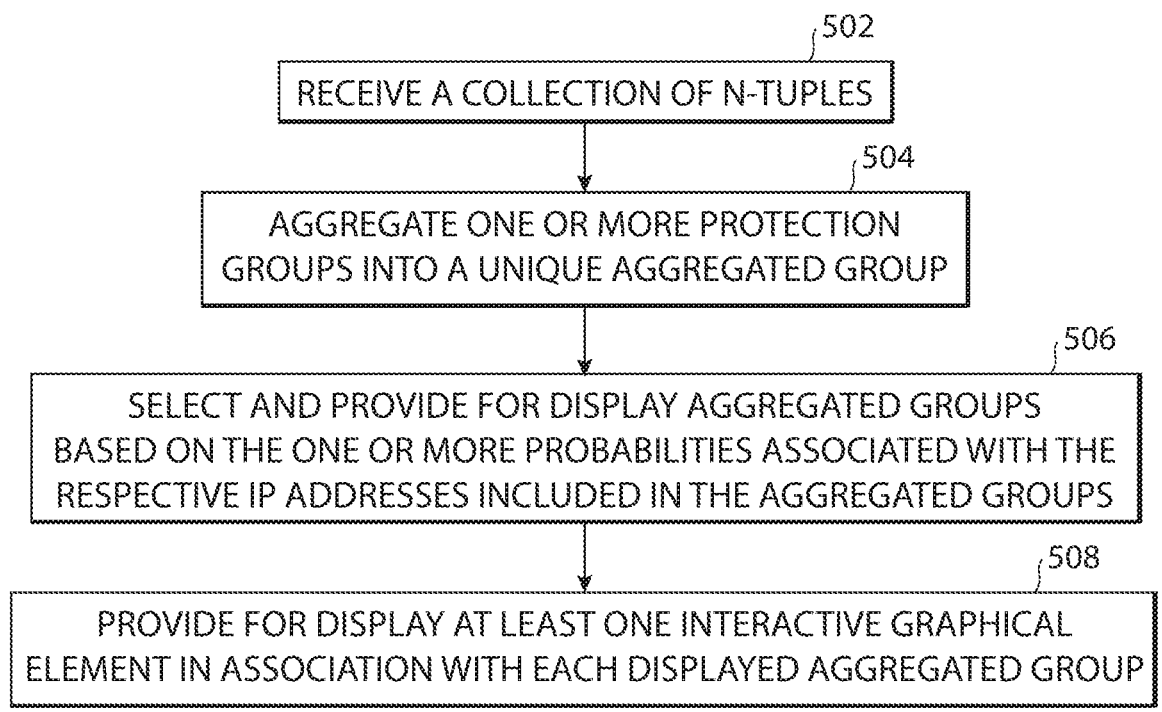
FIGS. 5 and 6 are example flowcharts showing an example method performed during deployment for aggregating and displaying information and obtaining user feedback, in accordance with an aspect of the disclosure.

With reference to FIG. 5, in accordance with one or more embodiments, a flowchart 500 shows an example method of assigning protected devices 108 to protection groups 150 in accordance with the disclosure. The method can be performed by an assignment component, such as assignment component 160 of PG classification component 112 shown in FIG. 1. At block 502, the assignment component 160 can receive a collection of n-tuples, wherein each n-tuple includes an IP address of a protected device 108 and a collection of one or more protection groups 150 that are classification possibilities for the IP address. The IP address of each n-tuple has an associated probability for each of the protection groups of the n-tuple. The probability represents a probability of the protection group being an appropriate classification for the IP address as determined by the PG classification component 112.

At block 504, one or more protection groups are aggregated into a unique aggregated group. The aggregated protection groups are possible classifications that have at least a threshold probability for a same unique combination of IP addresses. Each aggregated protection groups include one or more protection groups and a unique combination of IP addresses. Each of the IP addresses of the unique combination of IP addresses has a respective associated probability for each protection group included in the aggregated group.

At block 506, aggregated groups are selected and provided for display based on the one or more probabilities associated with the respective IP addresses included in the aggregated groups. The aggregated groups are displayed by a GUI, such as generated by a UI component, such as UI component 116 shown in FIG. 1.

At block 508, at least one interactive graphical element is provided for display, e.g., by the GUI, in association with each displayed aggregated group. A user can activate the respective interactive graphical elements to select one or more IP addresses included in one of the aggregated groups and one or more protection groups included in the aggregated group to accept (or reject) assignment of the selected IP address(es) to the selected protection group.

Figure 6:
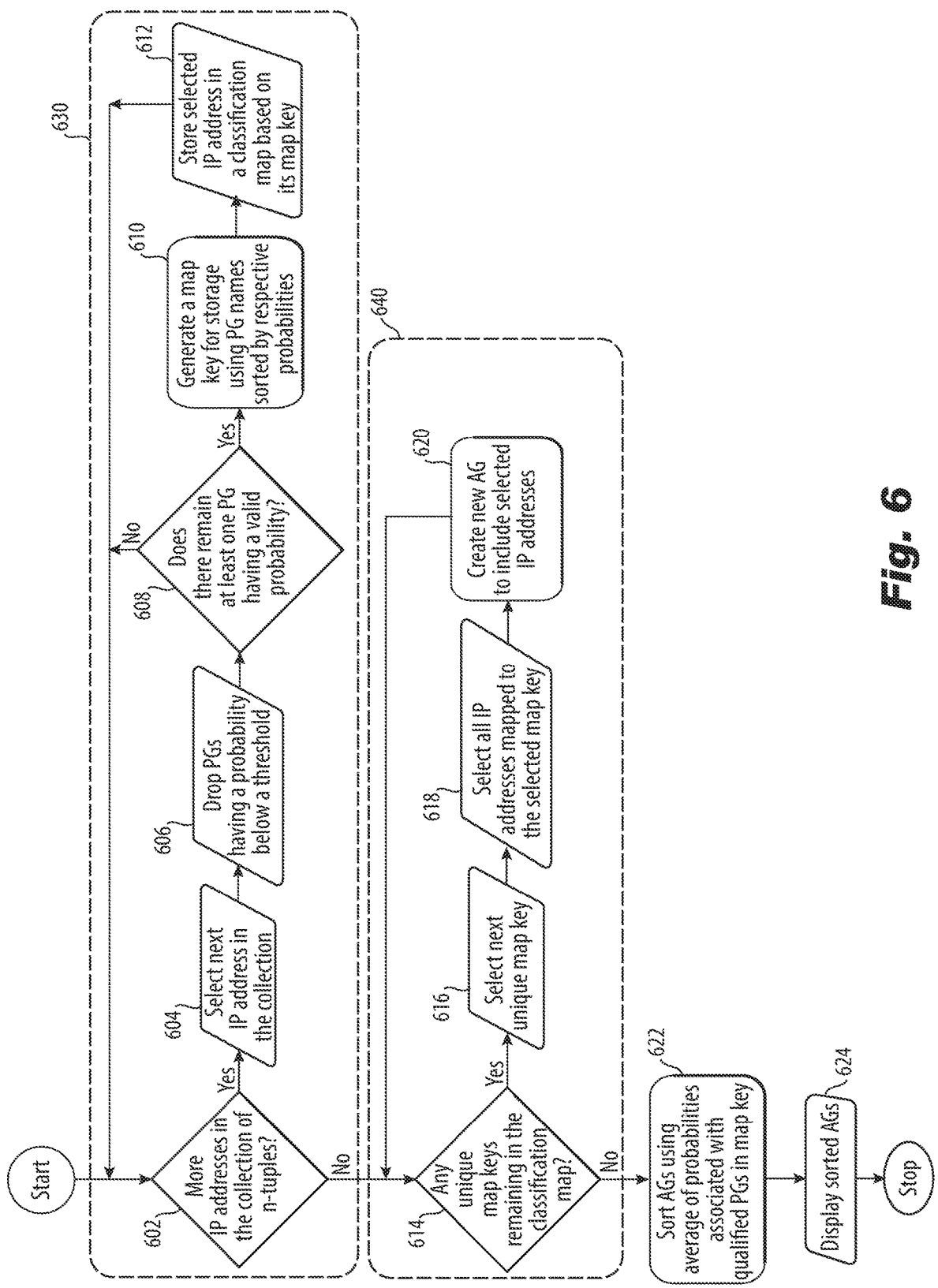

With reference to FIG. 6, in accordance with one or more embodiments, a flowchart 600 shows blocks 504 and 506 of FIG. 5 in greater detail in accordance with an example method. At block 602, a determination is made whether there are any more IP addresses from the collection of n-tuples to be processed.

If the determination at block 602 is YES, meaning there are more IP addresses to be processed, the method continues at block 604 at which a next IP address of the collection of n-tuples is selected. At block 606, any protection group associated with the IP address selected having a probability below a predetermined threshold is dropped from further consideration for classification or display.

At block 608, a determination is made whether at least one protection group having a valid probability remains. If the determination at block 608 is NO, meaning all of the protection groups have been dropped for the selected IP address, then the method continues at block 602. If the determination at block 608 is YES, meaning at least one protection groups remains for the selected IP address, then the method continues at block 610. At block 610, a map key is generated and stored. The map key includes the remaining protection groups associated with the selected IP address, sorted by their associated probabilities. At block 612, the selected IP address is stored in a classification map based on its map key. If the map key already exists, the IP address is mapped to the map key. If the map key does not exist yet, a new entry for the key is added to the classification map, and the IP address is mapped to the map key. A loop 630 including blocks 602-612 is repeated until all IP addresses in the collection of n-tuples are processed.

If the determination at block 602 is NO, meaning there are no more IP addresses to be processed in the collection of n-tuples, the method continues at block 614. At block 614, processing of the classification map begins by determining whether any unique map keys in the classification map remain for processing. If the determination at block 614 is YES, meaning there are more unique map keys in the classification map that remain for processing, the method continues at block 616, at which the next unique map key is selected for processing.

At block 618, all IP addresses mapped to the selected map key are selected for aggregation. At block 620, a new aggregated group (AG) is created that includes all of the IP addresses that were selected during the last iteration of block 618 for aggregation. A loop 640 including blocks 614-620 is repeated until all of the unique map keys in the classification map are processed.

If the determination at block 614 is NO, meaning there are no more unique map keys in the classification map to be processed, the method continues at block 622. At block 622, the aggregated groups are sorted based on an average of probabilities associated with the protection groups included in the map key and that satisfy a criteria. At block 624, the sorted aggregated groups are displayed.

With reference to FIG. 7, an example is shown that applies the method described in FIGS. 5 and 6. A classification map 700 is shown formed by applying loop 630 shown in FIG. 6, wherein classification map 700 maps IP addresses 702 to PGs 704. Each PG 704 has an associated probability 706. Based on their probabilities, the protection groups 704 are categorized into one of the following probability cluster: green (labeled high probability): (90%<=probability<=100%); yellow (labeled medium probability): (80%<=probability<=89%); red (labeled low probability): (20%<=probability<=79%). Any protection group having a probability below 20% is not shown in classification map 700, as these were dropped at block 606 of FIG. 6. Any IP addresses that do not have an associated protection group are not included in classification map 700, in accordance with the decision made at block 608. The map key generated at block 610 is generated to include protection groups categorized in the green and yellow clusters only, meaning the map key does not include any protection groups categorized in the red cluster.

Accordingly, as an example, the map key for IP address 1.2.3.4, not including any protection groups 704 categorized in the red cluster, is "PG6, PG3, PG1", sorted with the protection groups having the higher probability listed first.

The rules and thresholds applied for building the classification map 700, grouping protection groups based on their probabilities, or generating map keys are particular to the example and provided for illustration purposes. The disclosure is not limited to these particular rules and thresholds, and different rules and thresholds can be implemented, such as by adjusting system parameters of classification component 112.

An aggregation table 750 is shown that is formed by applying loop 640 shown in FIG. 6, wherein each aggregated group 752 is determined from aggregation map 700, with the aggregated groups 752. Each aggregated group 752 has a map key 754 (which was sorted at block 610 of FIG. 6), an average sort value 756, and a group of member IP addresses 758. The aggregated groups 752 are sorted based on their respective average sort values. The sort value 756 is the average of the probability associated with each protection group in the map key 754

Accordingly, as an example, AG1 corresponds to map key "PG6, PG3, PG1," includes three IP addresses (1.2.3.4, 2.3.4.5, 3.4.5.6), and has a sort value 89.3.

Figure 8:
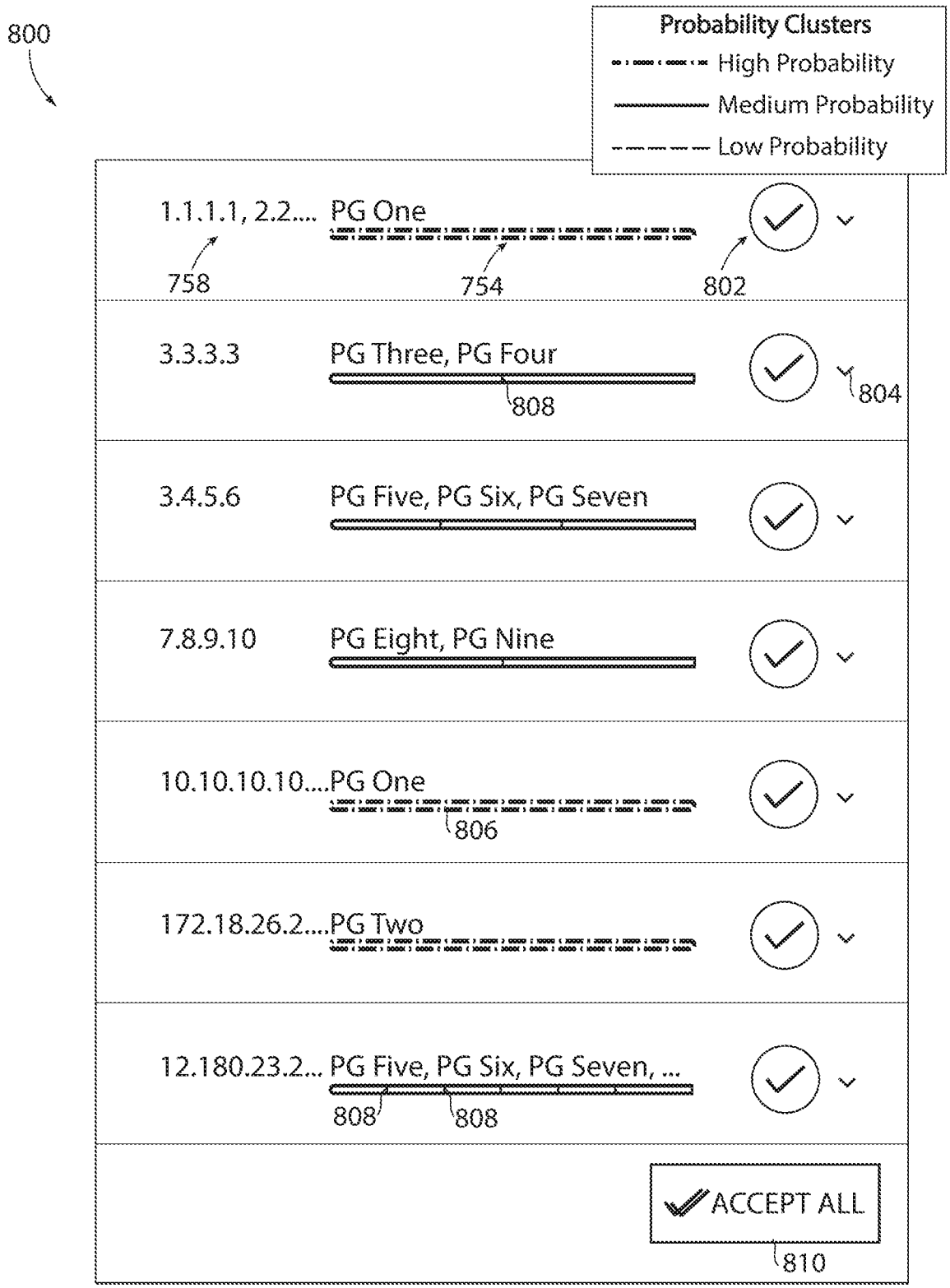
FIG. 8 shows an example screenshot of displayed assignment suggestions in a collapsed state, in accordance with an aspect of the disclosure.

With reference to FIG. 8, a display of a screen shot 800 of several aggregated groups is shown. Each row corresponds to an aggregated group. Screen shot 700 shows a map key 754 and a member IP addresses 758 for each aggregated group.

Also shown for each aggregated group is a selection icon 802 that is an interactive graphical element, which can be activated by a user to cause implementation of an assignment. In the current example, when the selection icon 802 is activated, the protection group in the corresponding key that has the highest probability is assigned as the protection group for each member IP address listed with member IP addresses 758. In one or more embodiments, the user can select only a portion of the member IP addresses 758, and activation of selection icon 802 will be applied to only the member IP addresses 758 that were selected. An accept-all icon 810 is provided that is an interactive graphical element, which can be activated by a user to cause implementation of an assignment for each of the aggregated groups to protection group determined to have the highest probability for that aggregated group.

Also shown for each aggregated group is an expand icon 804, which is an interactive graphical element that can be activated to expand or collapse information related to the associated aggregated group. In the example screenshot 800, all of the aggregated groups are shown displayed in a collapsed state.

In the collapsed state, a display bar 808 is shown, color coded, to show the probability group to which the protection groups included in the map key 754 are clustered. For example, the display bar 808 for the first row is color coded to show that all of the protection groups included in the map key 754 are categorized to the green cluster, and the display bar 808 for the second row is color coded to show that all of the protection groups included in the map key 754 are categorized to the yellow cluster.

A segment delimiter 808 is provided to delimit segments that belong to each protection group in the map key 754, with one segment corresponding to each protection group of the map key 754. The order of the segments can correspond to the order of the protection groups in the map key 754. For aggregated groups having only one protection group, there are no segment delimiters 808, and the entire display bar 806 is one segment. Although the segments are shown in FIG. 8 as having equal lengths, the lengths (or another graphic characteristic) can vary based on the probability of the corresponding protection group.

Different metadata can be displayed, such as in response to a metadata-access user action, e.g., a user hovering the cursor over a displayed element or right-clicking with the right button of a mouse when selecting a displayed element. For example, when a user hovers a cursor over a segment of display bars 806, the probability associated with the protection group that corresponds to the segment can be displayed overlaid on, or next to, the segment for the duration of the hover. Other metadata that can be accessed are full IP addresses (e.g., IPv6 addresses) when a metadata-access user action is applied to a shortened address of the member IP addresses 758; probability associated with a protection group when applying a metadata-access user action to a displayed name of protection group listed in the map key 754. The disclosure is not limited to the particular metadata that can be displayed or the described metadata actions for activating display of metadata.

Figure 9:
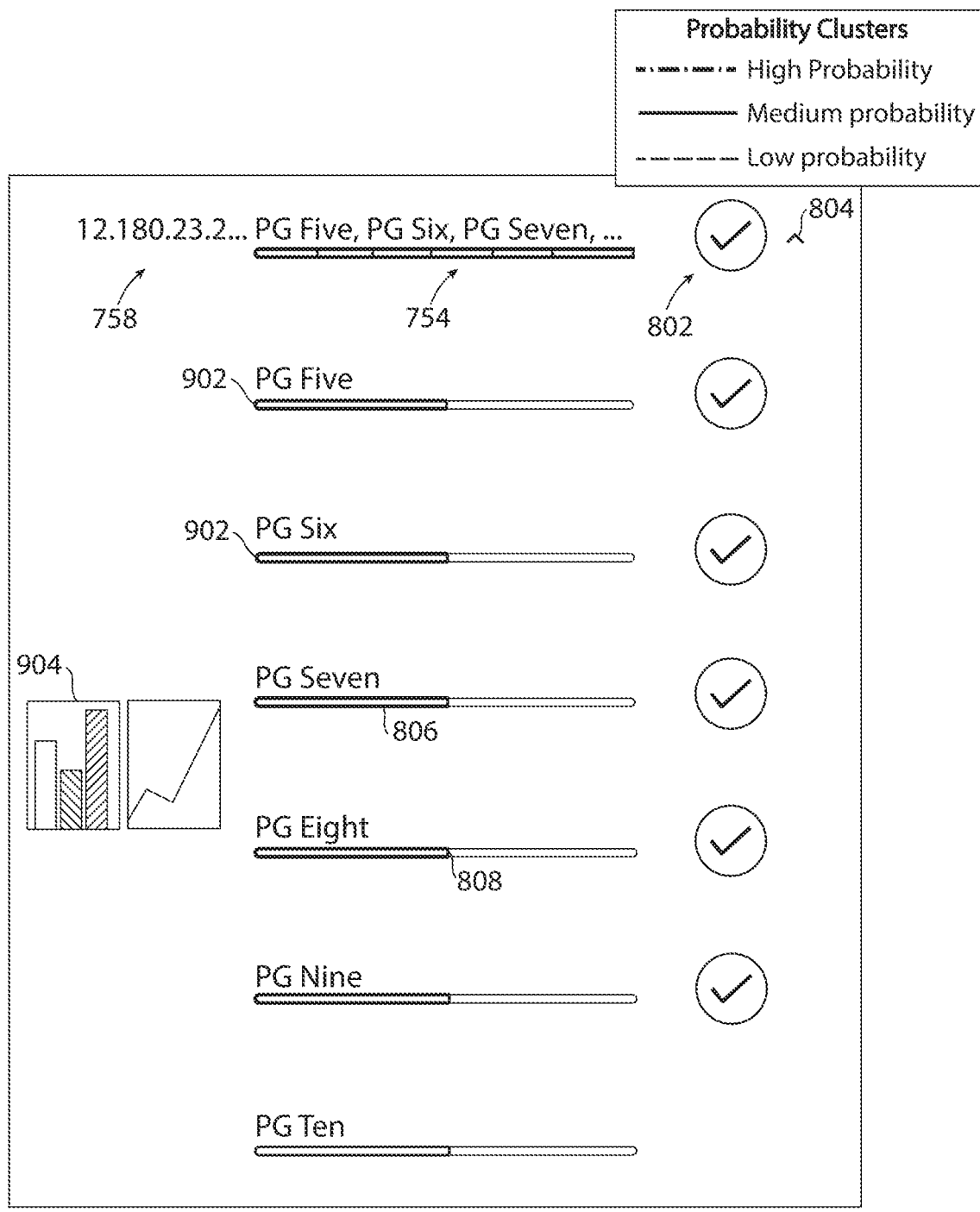
FIG. 9 shows an example screenshot of displayed assignment suggestions in an expanded state, in accordance with an aspect of the disclosure.

FIG. 9 shows the last row displayed in screenshot 800 of FIG. 8 in an expanded state after user activation of the expand icon 804. A display bar 806 is shown for each protection group of the map key 754. A selection icon 802 can be activated by a user to select any one of the protection groups to be assigned to all or a portion of the member IP addresses 758.

Corresponding to blocks 414 and 416 of FIG. 5, user selection of the protection group assignments provides feedback that is used by classification component 112 to assign probabilities to the various protection groups. The user selection can include any user feedback, such as acceptance of the suggested assignments or selection of a different assignment than the one suggested, The network protection system 102 will improve its functionality over time by machine learning based on the user feedback.

Accordingly, the interactive process implemented by the interactive component provides an efficient manner for a user to view, accept, or decline suggested protection group assignments by grouping the assignment suggestions into aggregated group assignments. The user's input may be particularly valuable when multiple models perform well, but provide conflicting assignment suggestions.

By filtering out the assignments that are classified as belonging to red clusters, the user is not bogged down with making decisions about weak suggestions for assignments. The user can focus on those assignments for which there are multiple strong suggestions. As the classification component 112 learns the user's preferences and characteristics of network system 100 over time, confidence in the suggested assignments will rise, as depicted by higher probabilities. In turn, the user will gain confidence in the assignment suggestions, perhaps eventually changing system parameter settings to allow the assignments to be more fully automated, with reduced need for user interaction.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network protection system 102, network statistics generator 122, mitigation device 130, and/or protected devices 108 may be implemented or executed by one or more computer systems. For example, network statistics generator 122, mitigation device 130, and/or protected devices 108 can be implemented using a computer system such as example computer system 1000 illustrated in FIG. 10. In various embodiments, computer system 1000 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 1000 is only one example of a suitable system and is not intended to suggest any limitation as to the scope of use or functionality of embodiments of the disclosure described herein. Regardless, computer system 1000 is capable of being implemented and/or performing any of the functionality set forth hereinabove.

Computer system 1000 may be described in the general context of computer system-executable instructions, such as program modules, being executed by a computer system. Generally, program modules may include routines, programs, objects, components, logic, data structures, and so on that perform particular tasks or implement particular abstract data types. Computer system 1000 may be practiced in distributed data processing environments where tasks are performed by remote processing devices that are linked through a communications network. In a distributed data processing environment, program modules may be located in both local and remote computer system storage media including memory storage devices.

Figure 10:
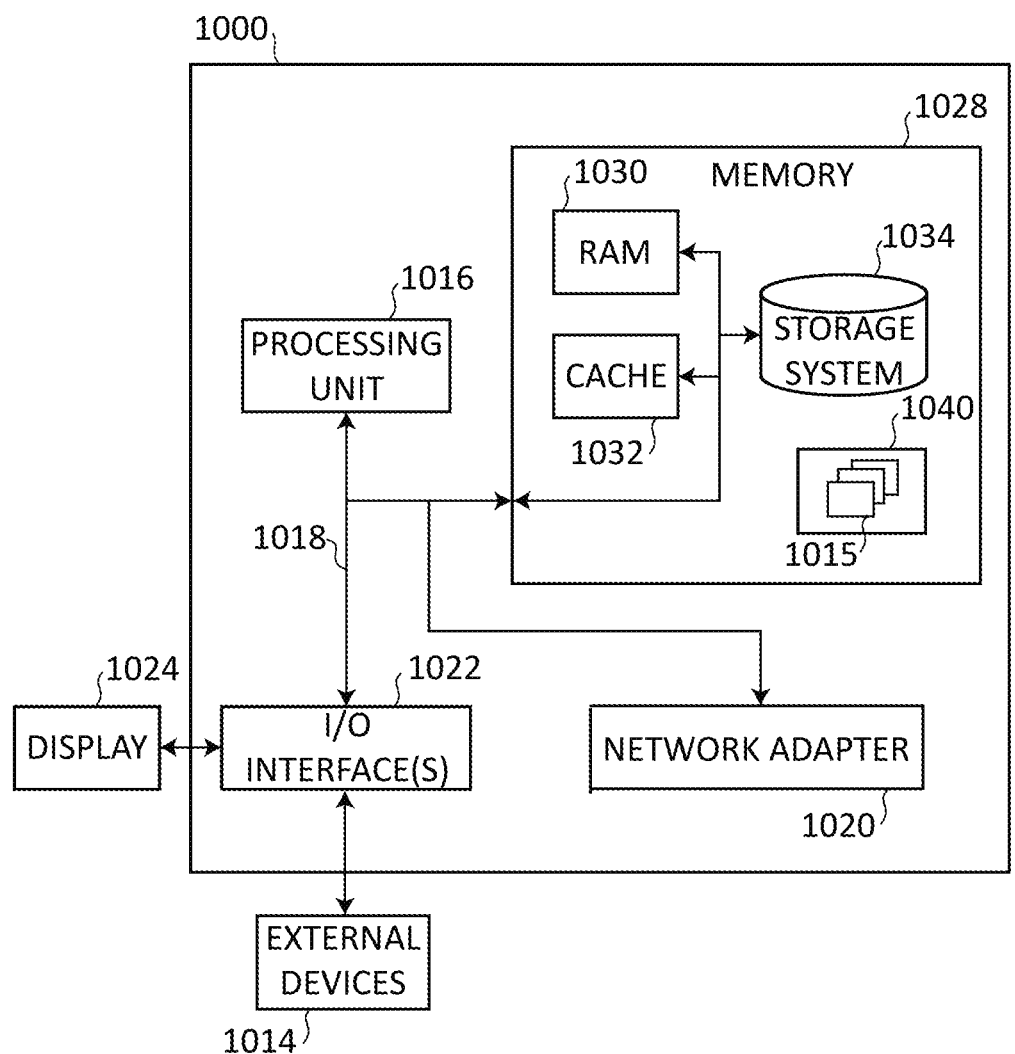
FIG. 10 illustrates an example computing system that could be used to implement the protected device or network protection system shown in FIG. 1.

Computer system 1000 is shown in FIG. 10 in the form of a general-purpose computing device. The components of computer system 1000 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1000 typically includes a variety of computer system readable media. Such media may be any available media that is accessible by computer system 1000, and it includes both volatile and non-volatile media, removable and non-removable media.

System memory 1028 can include computer system readable media in the form of volatile memory, such as random access memory (RAM) 1030 and/or cache memory 1032. Computer system 1000 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the disclosure.

Program/utility 1040, having a set (at least one) of program modules 1015, such as computer system 1000, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1015 generally carry out the functions and/or methodologies of embodiments of the disclosure as described herein.

Computer system 1000 may also communicate with one or more external devices 1014 such as a keyboard, a pointing device, a display 1024, etc.; one or more devices that enable a user to interact with computer system 1000; and/or any devices (e.g., network card, modem, etc.) that enable network statistics generator 122, mitigation device 130, and/or protected devices 108 to communicate with one or more other computing devices. Such communication can occur via Input/Output (I/O) interfaces 1022. Still yet, computer system 1000 can communicate with one or more networks such as a local area network (LAN), a general wide area network (WAN), and/or a public network (e.g., the Internet) via network adapter 1020. As depicted, network adapter 1020 communicates with the other components of network system 100 via bus 1018. It should be understood that although not shown, other hardware and/or software components could be used in conjunction with computer system 1000. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by automatic assignment of a protected device to a protected group, in addition to relieving administrators from tedious tasks, includes fine-tuned assignments based on actual, real time conditions, whereas manual assignments would be based on estimated conditions. Additionally, the assignments are updated automatically as network conditions or configurations change. The fine-tuning improves the accuracy and efficiency of network protection, reducing or minimizing false alerts and blocking of legitimate traffic.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method for interactive configuration of protection groupings for IP addresses of protected network hosts, the method comprising:
   receiving a collection of one or more protection groups that are classification possibilities for received IP addresses of protected network hosts;
   receiving a collection of n-tuples, each n-tuple including an IP address of a protected network host and probabilities associated with respective protection groups of the collection of the one or more protection groups, wherein each probability of the probabilities associated with each of the respective protection groups represents a probability that the protection group is an appropriate classification for the IP address, and wherein the probability associated with a first protection group of the one or more protection groups is determined by:
      receiving, from a plurality of Machine Learning (ML) models, classifications for the first protection group generated by the plurality of ML models;
      determining, responsive to receiving the classifications, a number of ML models of the plurality of ML models that output a classification of the classifications for the first protection group;
      determining a first score for the probability associated with the first protection group based on the number of ML models of the plurality of ML models that output the classification for the first protection group; and
      updating, based on real-time network data, the first score for the probability associated with the first protection group;
   for each n-tuple, of the collection of n-tuples:
      determining a map key that includes protection groups from the collection of the one or more protection groups that have respective probabilities of the probabilities that meets a predetermined threshold; and
      storing in a classification map the IP address in association with the map key;
   for each unique map key in the classification map, creating an aggregated group of respective protection groups of the one or more protection groups for one or more IP addresses that are stored in association with the map key;
   selecting and providing for display the aggregated group based on the probabilities associated with the respective protection groups corresponding to the one or more IP addresses associated with the map key; and
   providing for display at least one interactive graphical element in association with the aggregated group selected for display, wherein user activation of one of the at least one interactive graphical element accepts assignment of the one or more IP addresses included in the aggregated group to a selected protection group of the one or more protection groups included in the aggregated group.

2. The method of claim 1, wherein activation of the at least one interactive graphical element causes one or more of the IP addresses included in the aggregated group to be assigned to an appropriate protection group,
   when an individual protection group is selected using the at least one interactive graphical element, the appropriate protection group is the selected protection group, and
   when an individual protection group is not selected using the at least one interactive graphical element, the appropriate protection group is the protection group included in the aggregated group for which the protection groups corresponding to each selected IP address has the highest associated probability.

3. The method of claim 2,
   wherein when one or more individual IP addresses included in the aggregated group are selected using the at least one interactive graphical element, the selected one or more IP addresses are assigned to the appropriate protection group, and
   wherein when no IP addresses included in the aggregated group are selected using the at least one interactive graphical element, all of the IP addresses included in the protection group are assigned to the appropriate protection group.

4. The method of claim 2, wherein the IP addresses of each aggregated group are assigned an order as a function of the probability associated with protection groups corresponding to each of the IP addresses.

5. The method of claim 4, wherein the probability associated with protection groups corresponding to a given IP address that represents the probability of a particular protection group being an appropriate classification for the given IP address is determined to be relatively high as a function of at least one of the order assigned to the given IP address within one of the aggregated groups or a value of the probability relative to a predetermined threshold.

6. The method of claim 1, wherein the probability associated with protection groups corresponding to a given IP address that represents the probability of a particular protection group being an appropriate classification for the given IP address is determined by applying one or more ML models of the plurality of ML models that were trained using machine learning based on network traffic statistics of different network flows and defined assignments of the different network flows to protection groups.

7. The method of claim 1, wherein the aggregated groups are sorted based on whether the aggregated groups include one protection group, multiple protection groups, or no protection groups that are possible classifications to a given IP address included in the aggregated groups associated with a relatively high probability; or
for each aggregated group a score is determined as a function of the probabilities associated with protection groups included in the map key for the IP addresses associated with the map key, and the aggregated groups are sorted based on their scores.

8. The method of claim 7, wherein the aggregated groups are displayed based on the order in which the aggregated groups are sorted.

9. The method of claim 1, wherein providing one of the aggregated groups selected for display, includes displaying the IP addresses included in the aggregated group selected for display and selectively displaying identification of and the probability associated with each protection group included in the aggregated groups selected for display.

10. The method of claim 1, further comprising selectively providing an unexpanded display mode and an expanded display mode,
wherein when the unexpanded display mode is provided, a particular aggregated group is displayed using a contiguous graphic set having one associated interactive graphical element of the at least one interactive graphical elements and multiple joined portions, each joined portion corresponding to one of the protection groups included in the aggregated group, wherein activation of the associated interactive graphical element causes selected or all of the IP addresses included in the aggregated group to be assigned to the protection group included in the aggregated group that has the highest associated probability,
wherein when the expanded display mode is provided, the particular aggregated group is displayed using a non-contiguous graphic set having multiple unjoined portions, each unjoined portion having an associated interactive graphical element and corresponding to one of the protection groups included in the aggregated group, wherein activation of the interactive graphical elements associated with one of the unjoined portions causes selected or all of the IP addresses included in the aggregated group to be assigned to the protection group that corresponds to the unjoined portion.

11. The method of claim 1, further comprising providing a global interactive graphical element, wherein activation of the global interactive graphical element causes, for each of the aggregated groups selected for display, all of the IP addresses included in the aggregated group to be assigned to the protection group included in the aggregated group that has the highest associated probability.

12. The method of claim 1, wherein the protection groups included in each map key are sorted based on their associated probabilities corresponding to the IP addresses associated with the map key.

13. A system for interactive configuration of protection groupings for IP addresses of protected network hosts, the system comprising:
a memory configured to store a plurality of programmable instructions; and
at least one processing device in communication with the memory, wherein the at least one processing device, upon execution of the plurality of programmable instructions is configured to:
receive a collection of one or more protection groups that are classification possibilities for received IP addresses of protected network hosts;
receive a collection of n-tuples, each n-tuple including an IP address of a protected network host and probabilities associated with respective protection groups of the collection of one or more protection groups, wherein each probability of the probabilities associated with each of the respective protection groups represents a probability that the protection group is an appropriate classification for the IP address, and wherein the probability associated with a first protection group of the one or more protection groups is determined by:
receiving, from a plurality of Machine Learning (ML) models, classifications for the first protection group generated by the plurality of ML models;
determining, responsive to receipt of the classifications, a number of ML models of the plurality of ML models that output a classification of the classifications for the first protection group;
determining a first score for the probability associated with the first protection group based on the number of ML models of the plurality of ML models that output the classification for the first protection group; and
updating, based on real-time network data, the first score for the probability associated with the first protection group;
for each n-tuple, of the collection of n-tuples:
determine a map key that includes protection groups from the collection of the one or more protection groups that have respective probabilities of the probabilities that meets a predetermined threshold; and
store in a classification map the IP address in association with the map key;
for each unique map key in the classification map, create an aggregated group of respective protection groups of the one or more protection groups for one or more IP addresses that are stored in association with the map key;
select and providing for display the aggregated group based on the probabilities associated with the respective protection groups corresponding to the one or more IP addresses associated with the map key; and
provide for display at least one interactive graphical element in association with the aggregated group selected for display, wherein user activation of one of the at least one interactive graphical element accepts assignment of the one or more IP addresses included in the aggregated group to a selected protection group of the one or more protection groups included in the aggregated group.

14. The system of claim 13, wherein activation of the at least one interactive graphical element causes one or more of the IP addresses included in the aggregated group to be assigned to an appropriate protection group,
   when an individual protection group is selected using the at least one interactive graphical element, the appropriate protection group is the selected protection group, and
   when an individual protection group is not selected using the at least one interactive graphical element, the appropriate protection group is the protection group included in the aggregated group for which the protection groups corresponding to each selected IP address has the highest associated probability.

15. The system of claim 14,
   wherein when one or more individual IP addresses included in the aggregated group are selected using the at least one interactive graphical element, the selected one or more IP addresses are assigned to the appropriate protection group, and
   wherein when no IP addresses included in the aggregated group are selected using the at least one interactive graphical element, all of the IP addresses included in the protection group are assigned to the appropriate protection group.

16. The system of claim 14, wherein the IP addresses of each aggregated group are assigned an order as a function of the probability associated with protection groups corresponding to each of the IP addresses.

17. The system of claim 16, wherein the probability associated with protection groups corresponding to a given IP address that represents a probability of a particular protection group being an appropriate classification for the given IP address is determined to be relatively high as a function of at least one of the order assigned to the given IP address within one of the aggregated groups or a value of the probability relative to a predetermined threshold.

18. The system of claim 13, wherein the probability associated with protection groups corresponding to a given IP address that represents a probability of a particular protection group being an appropriate classification for the given IP address is determined by applying one or more ML models of the plurality ML models that were trained using machine learning.

19. The system of claim 13, wherein the aggregated groups are sorted based on whether the aggregated groups include one protection group, multiple protection groups, or no protection groups that are possible classifications to a given IP address included in aggregated groups associated with a relatively high probability; or
for each aggregated group a score is determined as a function of the probabilities associated with protection groups included in the map key for the IP addresses associated with the map key, and the aggregated groups are sorted based on their scores.

20. The system of claim 19, wherein the aggregated groups are displayed based on the order in which the aggregated groups are sorted.

21. The system of claim 13, wherein providing one of the aggregated groups selected for display includes displaying the IP addresses included in the aggregated group selected for display and selectively displaying identification of and the probability associated with each protection group included in the aggregated groups selected for display.

22. The system of claim 13, wherein the at least one processing device, upon execution of the plurality of programmable instructions is further configured to selectively provide an unexpanded display mode and an expanded display mode,
   wherein when the unexpanded display mode is provided, a particular aggregated group is displayed using a contiguous graphic set having one associated interactive graphical element of the at least one interactive graphical elements and multiple joined portions, each joined portion corresponding to one of the protection groups included in the aggregated group, wherein activation of the associated interactive graphical element causes selected or all of the IP addresses included in the aggregated group to be assigned to the protection group included in the aggregated group that has the highest associated probability,
   wherein when the expanded display mode is provided, the particular aggregated group is displayed using a non-contiguous graphic set having multiple unjoined portions, each unjoined portion having an associated interactive graphical element and corresponding to one of the protection groups included in the aggregated group, wherein activation of the interactive graphical elements associated with one of the unjoined portions causes selected or all of the IP addresses included in the aggregated group to be assigned to the protection group that corresponds to the unjoined portion.

23. The system of claim 13, wherein the at least one processing device, upon execution of the plurality of programmable instructions is further configured to provide a global interactive graphical element, wherein activation of the global interactive graphical element causes, for each of the aggregated groups selected for display, all of the IP addresses included in the aggregated group to be assigned to the protection group included in the aggregated group that has the highest associated probability.

* * * * *